US012639722B2

(12) United States Patent
Kopru et al.

(10) Patent No.: US 12,639,722 B2
(45) Date of Patent: *May 26, 2026

(54) ITEM FEATURE ACCURACY OPERATIONS AND INTERFACES IN AN ITEM LISTING SYSTEM

(71) Applicant: eBay Inc., San Jose, CA (US)

(72) Inventors: Selcuk Kopru, San Jose, CA (US); Ellis Shui-Man Luk, South San Francisco, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/921,993

(22) Filed: Oct. 21, 2024

(65) Prior Publication Data

US 2025/0053999 A1      Feb. 13, 2025

Related U.S. Application Data

(63) Continuation of application No. 17/224,887, filed on Apr. 7, 2021, now Pat. No. 12,125,047.

(51) Int. Cl.

| | |
|---|---|
| *G06Q 30/02* | (2023.01) |
| *G06F 18/22* | (2023.01) |
| *G06N 5/04* | (2023.01) |
| *G06N 20/00* | (2019.01) |
| *G06Q 30/018* | (2023.01) |

(Continued)

(52) U.S. Cl.
CPC .......... *G06Q 30/018* (2013.01); *G06F 18/22* (2023.01); *G06N 5/04* (2013.01); *G06N 20/00* (2019.01); *G06V 20/46* (2022.01); *G06Q 30/0627* (2013.01)

(58) Field of Classification Search
CPC ............ G06Q 30/018; G06Q 30/0627; G06Q 30/0207–30/0277; G06F 18/22; G06N 5/04; G06N 20/00; G06N 3/0442; G06N 3/0464; G06V 20/46
See application file for complete search history.

(56) References Cited

U.S. PATENT DOCUMENTS 10,621,655 B1 * 4/2020 Benkreira .......... G06Q 30/0613
10,623,423 B1 * 4/2020 Sadaghiani ......... H04L 63/1416
(Continued)

*Primary Examiner* — Thuy N Nguyen
(74) *Attorney, Agent, or Firm* — Shook, Hardy & Bacon L.L.P.

(57) ABSTRACT

Various methods and systems for providing indications of inconsistent attributes of item listings associated in item listing videos. An item listing video—of an item listing—is accessed. The item listing video is accessed via an item listing interface of an item listing system. Extracted item features—via a machine learning engine—of an item from the item listing video, are accessed. The extracted item features are extracted based on listing-interface item features associated with listing the item. The extracted item features of the item are compared to the listing-interface item features of the item. Based on comparing the listing-interface item features to the extracted, an inconsistent attribute—between an extracted item feature and a listing-interface item feature that is associated with listing the item—is identified. An indication of an inconsistent attribute is communicated to cause display of the indication of the inconsistent attribute at the item listing interface.

20 Claims, 9 Drawing Sheets

(51) Int. Cl.
  *G06V 20/40*  (2022.01)
  *G06Q 30/0601*  (2023.01)

(56)  References Cited

U.S. PATENT DOCUMENTS

| | | | |
|---|---|---|---|
| 11,710,081 B2 * | 7/2023 | Abrahamian | G06Q 40/03 |
| | | | 705/75 |
| 12,212,681 B1 * | 1/2025 | Drapeau | G06Q 20/085 |
| 2008/0128496 A1 * | 6/2008 | Bertranou | G06Q 10/08 |
| | | | 235/383 |
| 2017/0186032 A1 * | 6/2017 | Rangasamy Kannadasan | |
| | | | G06Q 30/0248 |
| 2017/0372317 A1 * | 12/2017 | Wang | G06Q 20/10 |
| 2018/0218283 A1 * | 8/2018 | Jenson | G06Q 50/01 |
| 2019/0205962 A1 | 7/2019 | Piramuthu et al. | |
| 2020/0334688 A1 | 10/2020 | Trujillo et al. | |
| 2021/0027306 A1 * | 1/2021 | Somaraju | G06Q 50/01 |
| 2021/0090143 A1 * | 3/2021 | Chalkley | H04N 23/69 |
| 2021/0383394 A1 * | 12/2021 | Zarakas | G06F 18/214 |
| 2022/0156634 A1 * | 5/2022 | Margolin | G06N 20/00 |
| 2022/0245514 A1 * | 8/2022 | Venkatasubramaniam | |
| | | | G06N 20/20 |
| 2022/0329630 A1 * | 10/2022 | Li | G06F 21/577 |

* cited by examiner

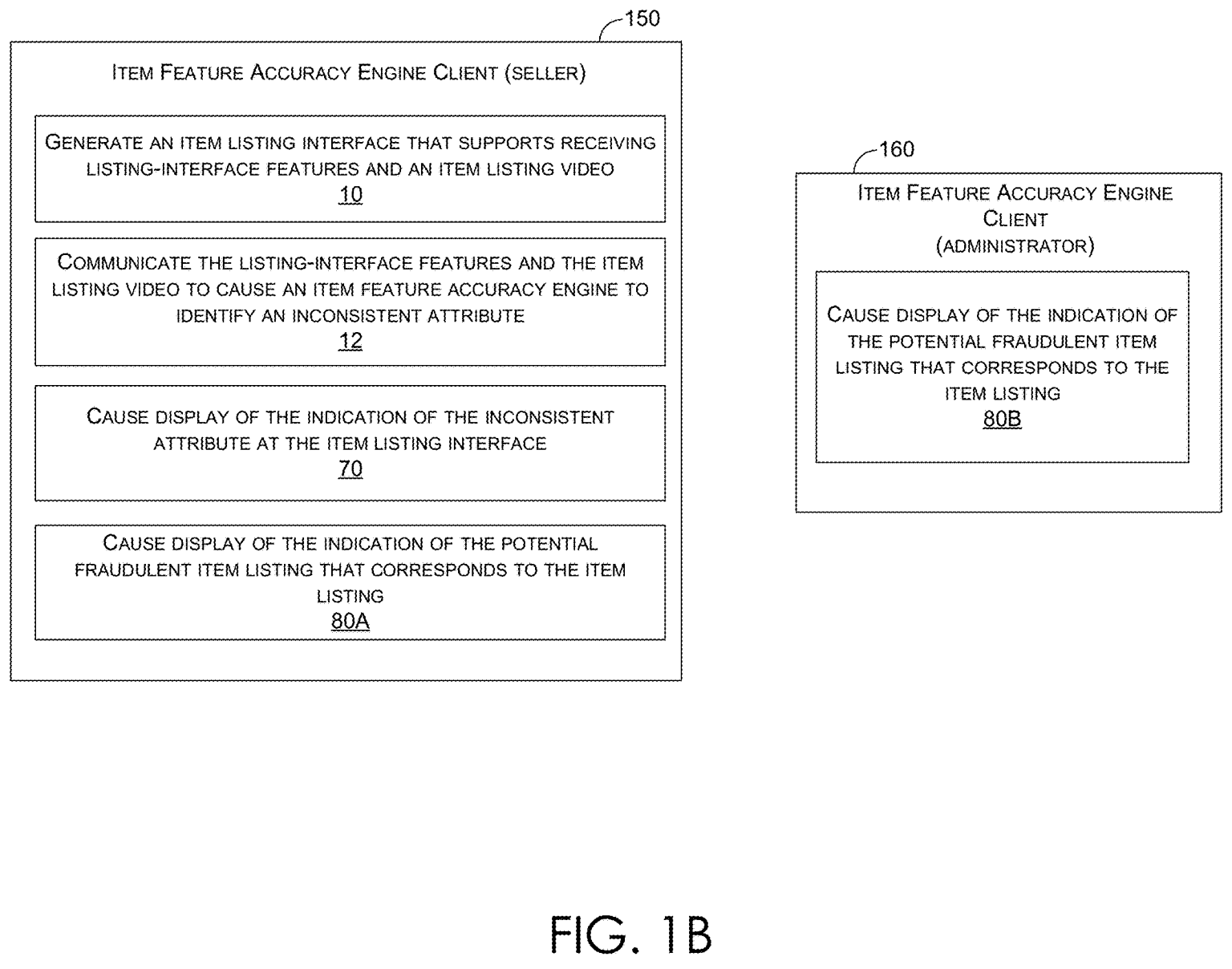

ITEM FEATURE ACCURACY ENGINE CLIENT (ADMINISTRATOR)
160

CAUSE DISPLAY OF THE INDICATION OF THE POTENTIAL FRAUDULENT ITEM LISTING THAT CORRESPONDS TO THE ITEM LISTING
80B

ITEM FEATURE ACCURACY ENGINE CLIENT (SELLER)
150

GENERATE AN ITEM LISTING INTERFACE THAT SUPPORTS RECEIVING LISTING-INTERFACE FEATURES AND AN ITEM LISTING VIDEO
10

COMMUNICATE THE LISTING-INTERFACE FEATURES AND THE ITEM LISTING VIDEO TO CAUSE AN ITEM FEATURE ACCURACY ENGINE TO IDENTIFY AN INCONSISTENT ATTRIBUTE
12

CAUSE DISPLAY OF THE INDICATION OF THE INCONSISTENT ATTRIBUTE AT THE ITEM LISTING INTERFACE
70

CAUSE DISPLAY OF THE INDICATION OF THE POTENTIAL FRAUDULENT ITEM LISTING THAT CORRESPONDS TO THE ITEM LISTING
80A

FIG. 1B

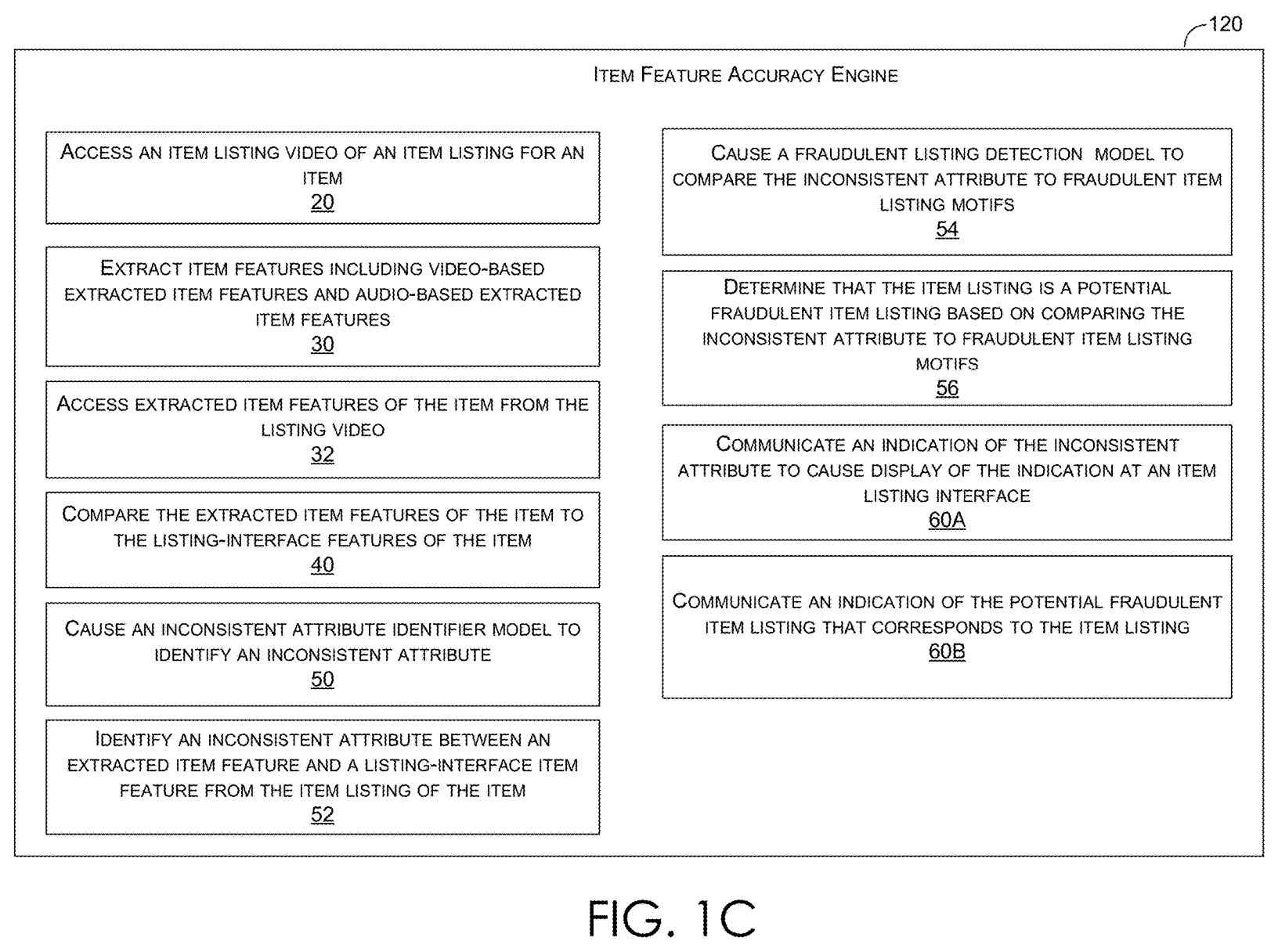

ITEM FEATURE ACCURACY ENGINE    120

ACCESS AN ITEM LISTING VIDEO OF AN ITEM LISTING FOR AN ITEM
20

EXTRACT ITEM FEATURES INCLUDING VIDEO-BASED EXTRACTED ITEM FEATURES AND AUDIO-BASED EXTRACTED ITEM FEATURES
30

ACCESS EXTRACTED ITEM FEATURES OF THE ITEM FROM THE LISTING VIDEO
32

COMPARE THE EXTRACTED ITEM FEATURES OF THE ITEM TO THE LISTING-INTERFACE FEATURES OF THE ITEM
40

CAUSE AN INCONSISTENT ATTRIBUTE IDENTIFIER MODEL TO IDENTIFY AN INCONSISTENT ATTRIBUTE
50

IDENTIFY AN INCONSISTENT ATTRIBUTE BETWEEN AN EXTRACTED ITEM FEATURE AND A LISTING-INTERFACE ITEM FEATURE FROM THE ITEM LISTING OF THE ITEM
52

CAUSE A FRAUDULENT LISTING DETECTION MODEL TO COMPARE THE INCONSISTENT ATTRIBUTE TO FRAUDULENT ITEM LISTING MOTIFS
54

DETERMINE THAT THE ITEM LISTING IS A POTENTIAL FRAUDULENT ITEM LISTING BASED ON COMPARING THE INCONSISTENT ATTRIBUTE TO FRAUDULENT ITEM LISTING MOTIFS
56

COMMUNICATE AN INDICATION OF THE INCONSISTENT ATTRIBUTE TO CAUSE DISPLAY OF THE INDICATION AT AN ITEM LISTING INTERFACE
60A

COMMUNICATE AN INDICATION OF THE POTENTIAL FRAUDULENT ITEM LISTING THAT CORRESPONDS TO THE ITEM LISTING
60B

FIG. 1C

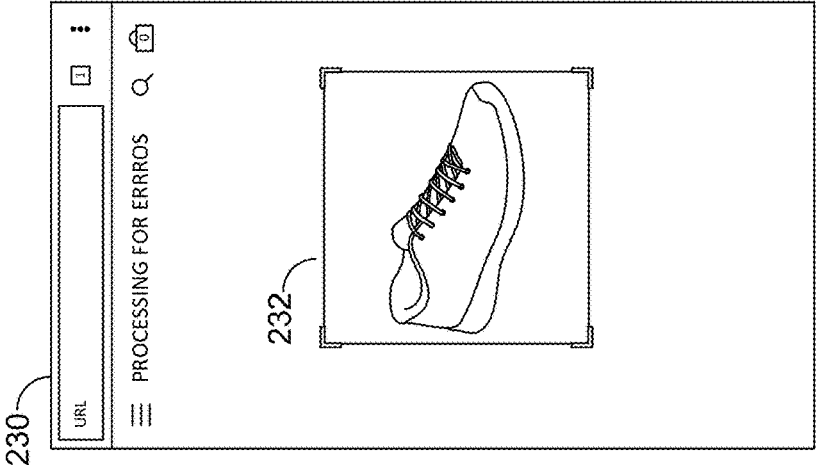
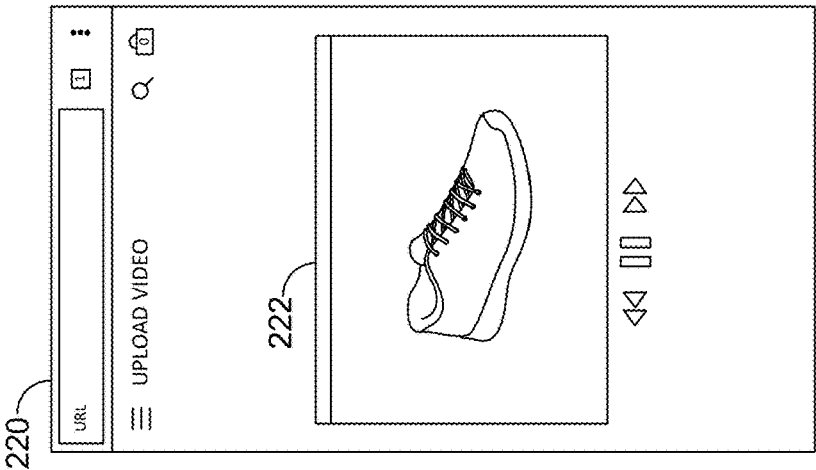
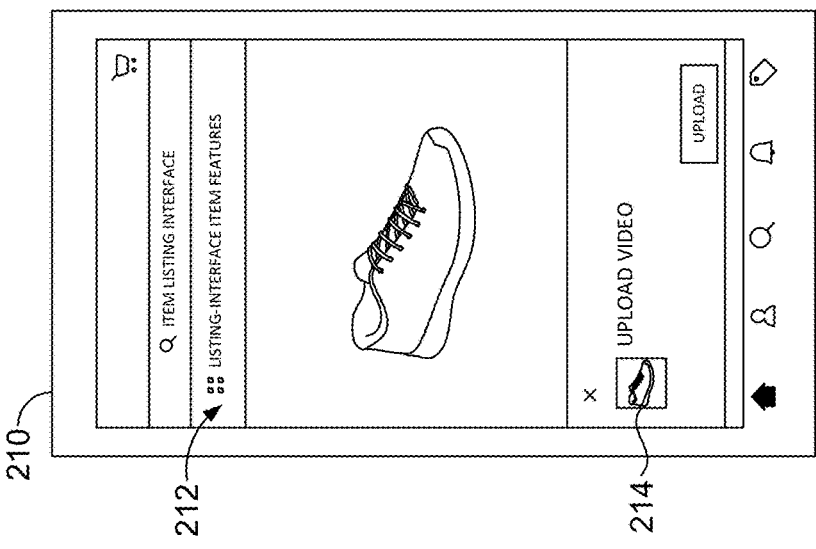
FIG. 2A

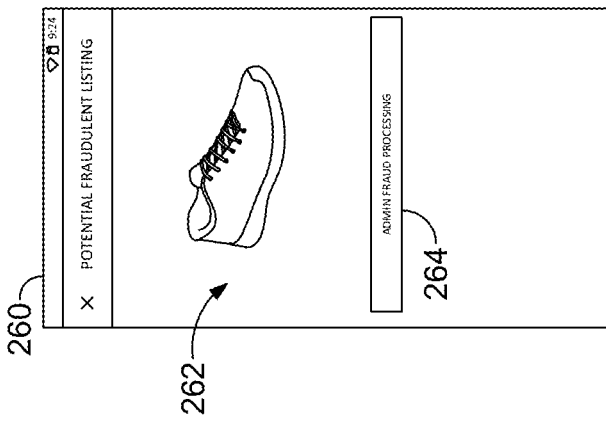
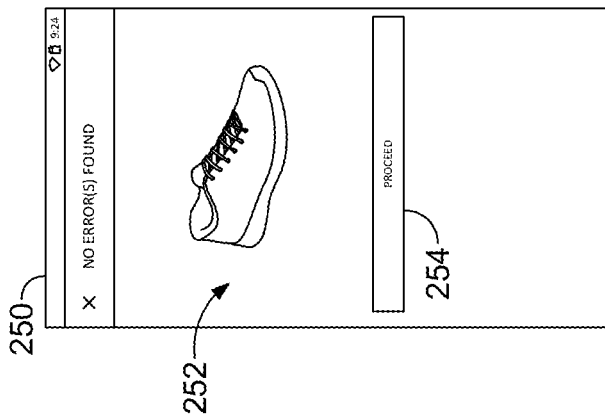
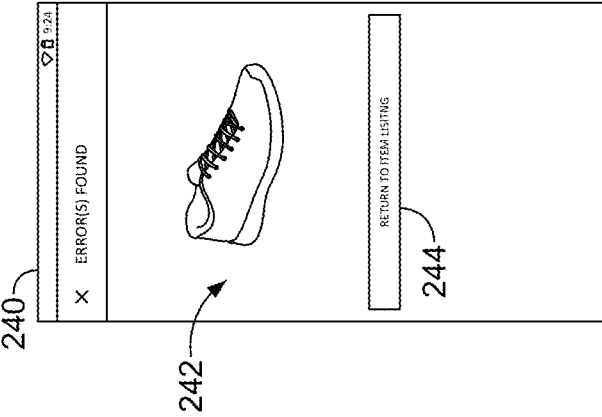
FIG. 2B

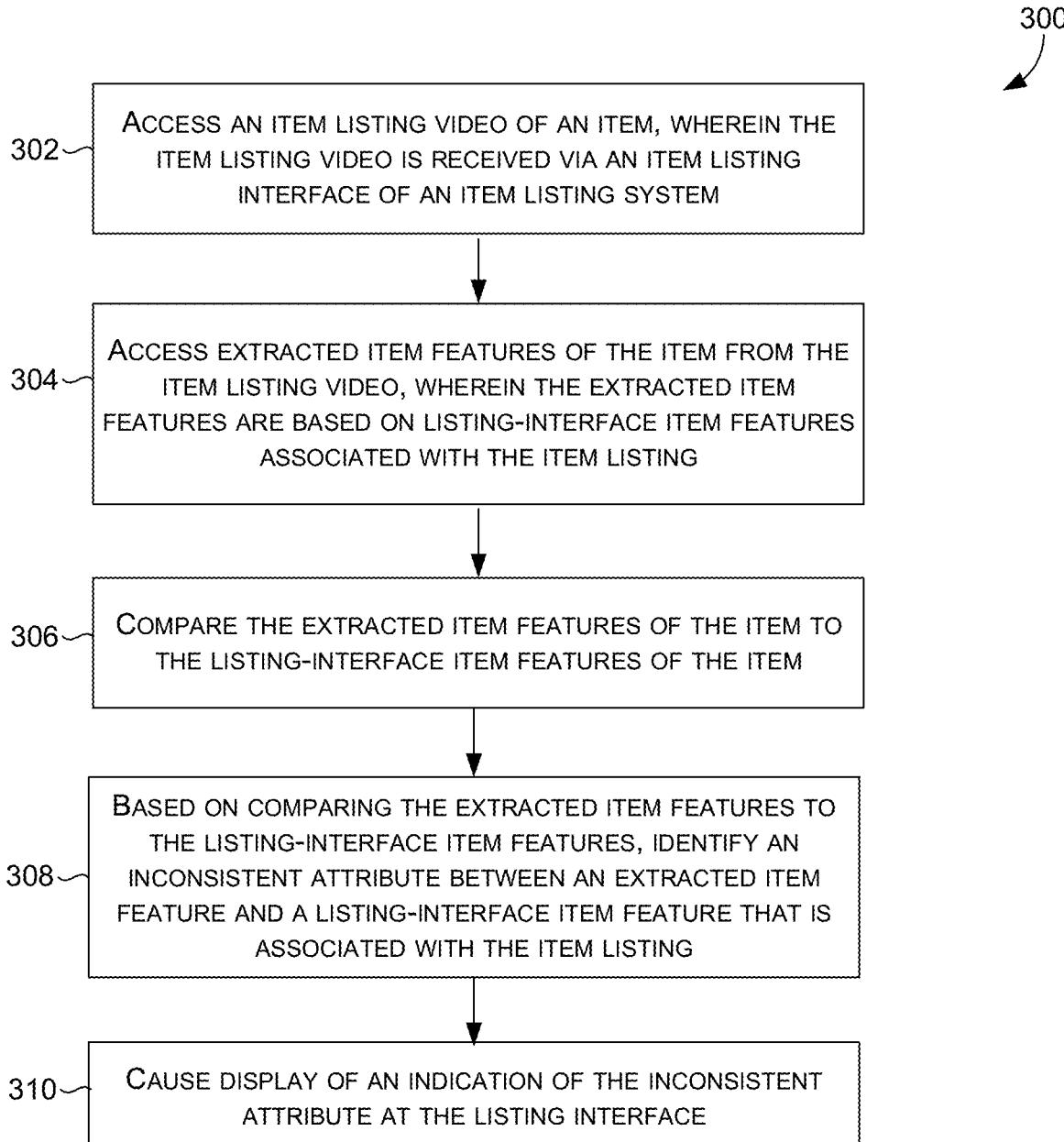

300

302 — ACCESS AN ITEM LISTING VIDEO OF AN ITEM, WHEREIN THE ITEM LISTING VIDEO IS RECEIVED VIA AN ITEM LISTING INTERFACE OF AN ITEM LISTING SYSTEM

304 — ACCESS EXTRACTED ITEM FEATURES OF THE ITEM FROM THE ITEM LISTING VIDEO, WHEREIN THE EXTRACTED ITEM FEATURES ARE BASED ON LISTING-INTERFACE ITEM FEATURES ASSOCIATED WITH THE ITEM LISTING

306 — COMPARE THE EXTRACTED ITEM FEATURES OF THE ITEM TO THE LISTING-INTERFACE ITEM FEATURES OF THE ITEM

308 — BASED ON COMPARING THE EXTRACTED ITEM FEATURES TO THE LISTING-INTERFACE ITEM FEATURES, IDENTIFY AN INCONSISTENT ATTRIBUTE BETWEEN AN EXTRACTED ITEM FEATURE AND A LISTING-INTERFACE ITEM FEATURE THAT IS ASSOCIATED WITH THE ITEM LISTING

310 — CAUSE DISPLAY OF AN INDICATION OF THE INCONSISTENT ATTRIBUTE AT THE LISTING INTERFACE

FIG. 3

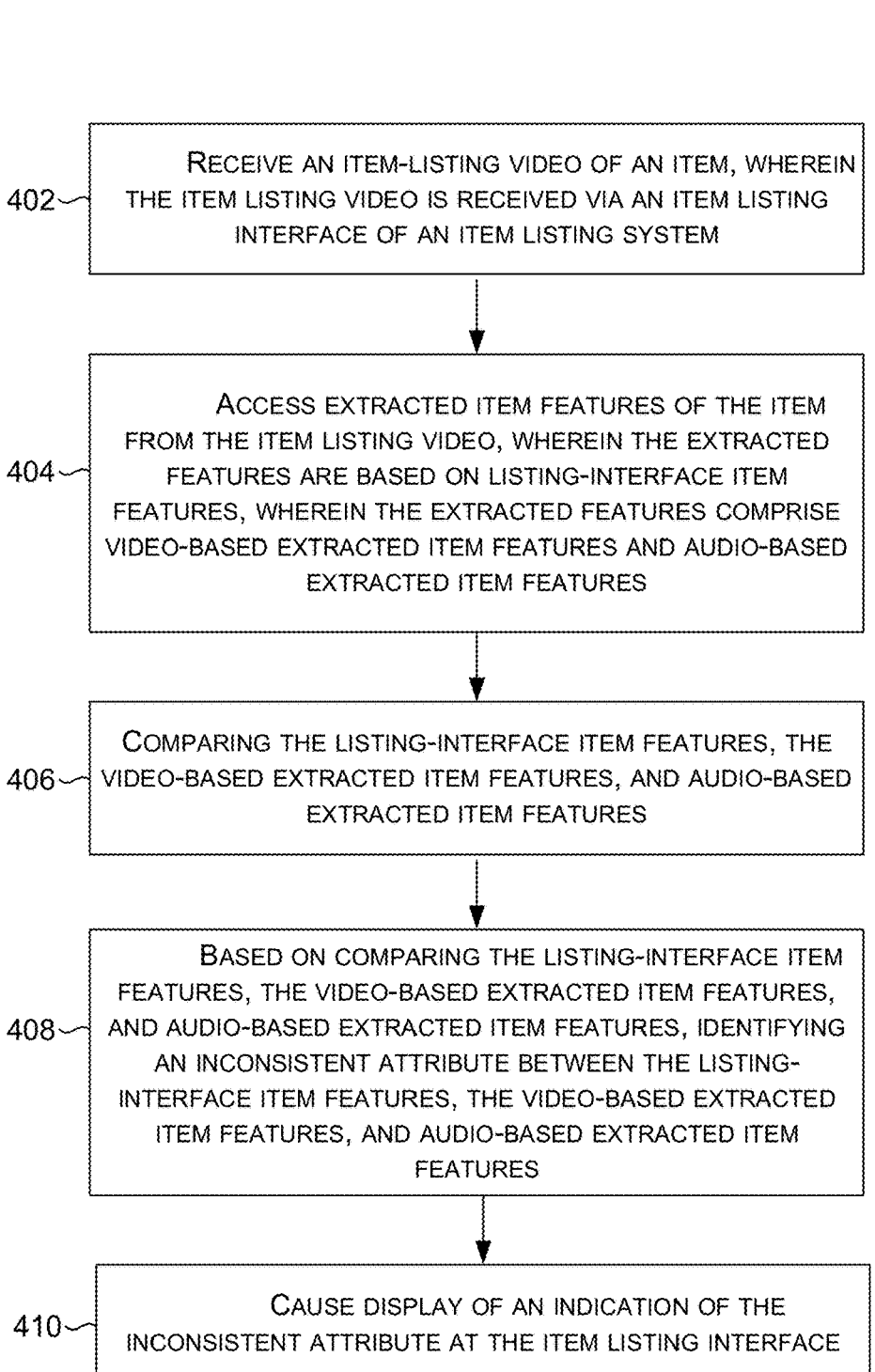

402 — RECEIVE AN ITEM-LISTING VIDEO OF AN ITEM, WHEREIN THE ITEM LISTING VIDEO IS RECEIVED VIA AN ITEM LISTING INTERFACE OF AN ITEM LISTING SYSTEM

404 — ACCESS EXTRACTED ITEM FEATURES OF THE ITEM FROM THE ITEM LISTING VIDEO, WHEREIN THE EXTRACTED FEATURES ARE BASED ON LISTING-INTERFACE ITEM FEATURES, WHEREIN THE EXTRACTED FEATURES COMPRISE VIDEO-BASED EXTRACTED ITEM FEATURES AND AUDIO-BASED EXTRACTED ITEM FEATURES

406 — COMPARING THE LISTING-INTERFACE ITEM FEATURES, THE VIDEO-BASED EXTRACTED ITEM FEATURES, AND AUDIO-BASED EXTRACTED ITEM FEATURES

408 — BASED ON COMPARING THE LISTING-INTERFACE ITEM FEATURES, THE VIDEO-BASED EXTRACTED ITEM FEATURES, AND AUDIO-BASED EXTRACTED ITEM FEATURES, IDENTIFYING AN INCONSISTENT ATTRIBUTE BETWEEN THE LISTING-INTERFACE ITEM FEATURES, THE VIDEO-BASED EXTRACTED ITEM FEATURES, AND AUDIO-BASED EXTRACTED ITEM FEATURES

410 — CAUSE DISPLAY OF AN INDICATION OF THE INCONSISTENT ATTRIBUTE AT THE ITEM LISTING INTERFACE

FIG. 4

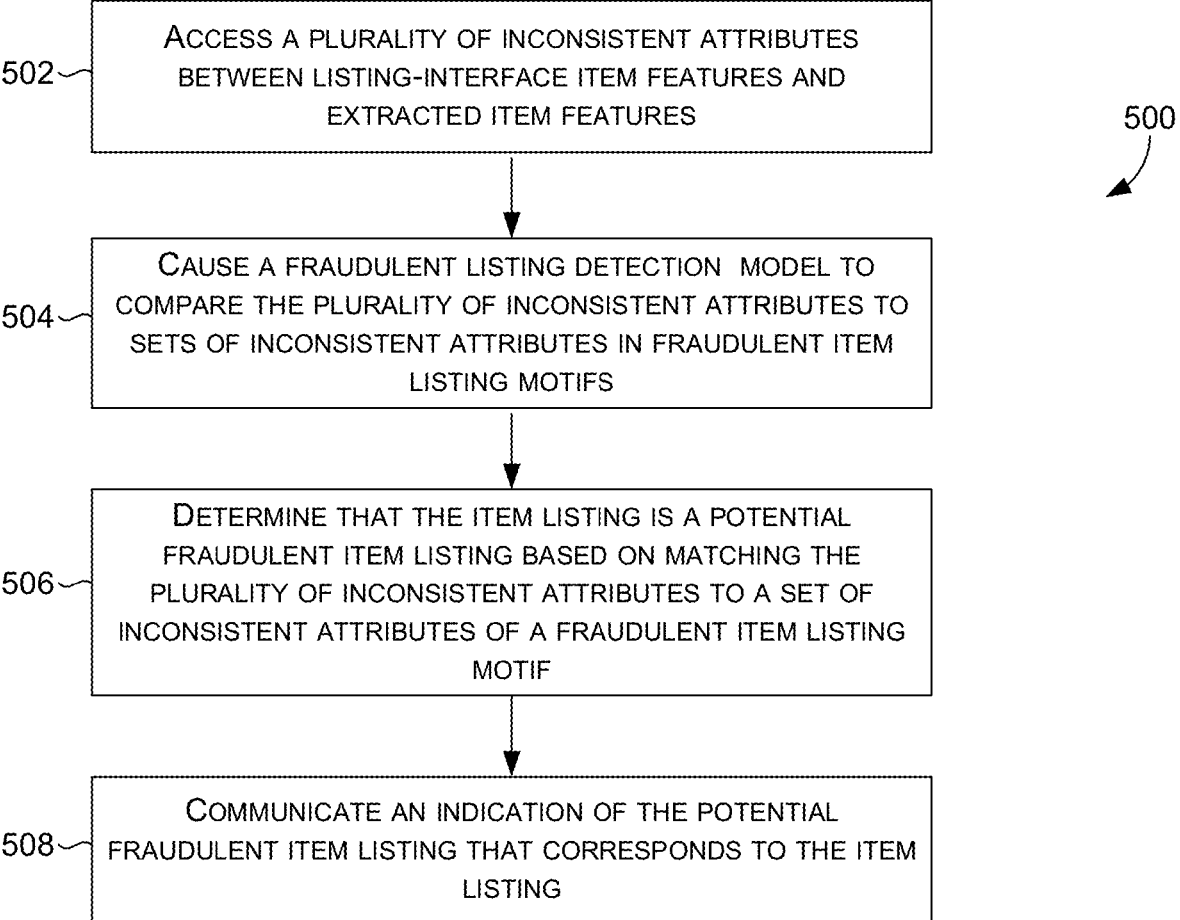

502 — ACCESS A PLURALITY OF INCONSISTENT ATTRIBUTES BETWEEN LISTING-INTERFACE ITEM FEATURES AND EXTRACTED ITEM FEATURES

500

504 — CAUSE A FRAUDULENT LISTING DETECTION MODEL TO COMPARE THE PLURALITY OF INCONSISTENT ATTRIBUTES TO SETS OF INCONSISTENT ATTRIBUTES IN FRAUDULENT ITEM LISTING MOTIFS

506 — DETERMINE THAT THE ITEM LISTING IS A POTENTIAL FRAUDULENT ITEM LISTING BASED ON MATCHING THE PLURALITY OF INCONSISTENT ATTRIBUTES TO A SET OF INCONSISTENT ATTRIBUTES OF A FRAUDULENT ITEM LISTING MOTIF

508 — COMMUNICATE AN INDICATION OF THE POTENTIAL FRAUDULENT ITEM LISTING THAT CORRESPONDS TO THE ITEM LISTING

FIG. 5

ITEM FEATURE ACCURACY OPERATIONS AND INTERFACES IN AN ITEM LISTING SYSTEM

CROSS-REFERENCE TO RELATED APPLICATIONS

This application is a Continuation of U.S. patent application Ser. No. 17/224,887, filed on Apr. 7, 2021. The entire contents of which are incorporated here in its entirety.

BACKGROUND

Users often rely on search systems to help find information stored on computer systems. Such search systems support identifying, for received search queries, search query result items from item databases. For example, a search query, can be executed using a search system to find relevant search result items for the search query. The search can be performed to identify different types of items that have been listed through an item listing interface of the search system. The item listing interface may support receiving item features and other media from a user. For example, a seller may access the item listing interface to list a pair of "AIR JORDAN 1 MID BLACK HYPER ROYAL BLUE RETRO" gym shoes with item features (e.g., blue, new, and available for auction). The seller can also provide a video, where the seller discusses the gym shoes—and further uploads images of the gym shoes.

Conventional search systems are limited in their capacity to support a framework for detecting inconsistencies between item features that are provided and actual item features of items. For example, conventional search systems are unable to detect that a seller mistakenly (or intentionally to mislead buyers) uploaded pictures for "AIR JORDAN 1 BLACK AND RED" but entered a title "AIR JORDAN 1 MID BLACK HYPER ROYAL BLUE"—so remedial action can be taken. With the ever-increasing use of search systems for retrieving electronically stored information, improvements in computing operations and interfaces for search systems can provide more efficient processing of item feature accuracy operations and efficiency in user navigation of item listing tools and related graphical user interfaces in search systems.

SUMMARY

Embodiments of the present invention relate to methods, systems and computer storage media for providing indications of inconsistent attributes in item listings that include item listing videos associated with an item listing interface. The inconsistent attribute—that corresponds to an item feature category (e.g., color, brand, delivery, price)—indicates unexpected or unacceptable discrepancies between item features provided in the item listing and extracted item features from the listing videos. The item listing interface supports receiving an item listing video ("video") and item features (e.g., listing-interface item features), such that extracted item features of the item—from the video—are compared to the item features. Comparing the extracted item features to the item features supports identifying and providing inconsistent attributes between the extracted item features and the item features. For example, a seller may upload a video that includes "AIR JORDAN 1 MID BLACK HYPER ROYAL BLUE" gym shoes and erroneously provide a description that indicates that the color of the gym shoes are "BLACK and RED." The extracted item color from the description will be identified as being inconsistent (i.e., an inconsistent attribute) between the video and the item feature provided—"ROYAL BLUE" compared to "BLACK and RED."

In addition, the extracted item features can be associated with different—feature types—such that the inconsistent attributes are determined based on whether the extracted item features are extracted based on video features or audio features of the video. For example, a seller may upload a video, and extracted item features from the video can been identified as different types of extracted item features (i.e., video and audio). The video features and audio features—along with the item features—can all be used as signals for determining inconsistent attributes, with several different combinations of inconsistency between the three types of features. For example, video features may identify a video-based extracted item feature color—for "AIR JORDAN 1 MID BLACK HYPER ROYAL BLUE" gyms shoes—as "ROYAL BLUE" and audio features (e.g., audio from the seller stating the shoes are "ROYAL BLUE" in the audio) may also identify an audio-based extracted item feature color as "ROYAL BLUE." In contrast, a description from the seller indicates that the color of the gym shoes are "BLACK and RED." Thus item feature color "BLACK and RED" can be identified as being inconsistent with both the video-based extracted item feature color and the audio-based extracted item feature color "ROYAL BLUE." As such, the video-based extracted item features, audio-based extracted item features, and item features can be compared between each other to determine inconsistent attributes identified between all three types of item features.

Also, inconsistent attributes in item listings can support fraud detection. In particular, comparing extracted item features and item features (i.e., listing-interface item features) can be based on a machine learning engine (e.g., a fraudulent listing detection model) that includes several different variations of fraudulent item listing motifs. A fraudulent item listing motif identifies a set of inconsistent attributes for an item listing (e.g., an image having a brand logo, however, the description is missing the brand logo) associated with fraudulent activity. Basically, inconsistent attributes associated with fraudulent item listing often occur in the same manner. For example, a fraudulent software motif may include a low price, special characters in the title, descriptions that does not mention a brand, and a particular delivery method (e.g., instant delivery) that are inconsistent with the images provided with the listing. In this way, the fraudulent item listing motifs can be associated with item listing videos to support identifying inconsistent attributes and further make a prediction that an item listing a potential fraudulent item listing.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein:

FIGS. 1A, 1B, and 1C are block diagrams of an exemplary search system with an item feature accuracy engine, in which embodiments described herein may be employed;

FIGS. 2A and 2B are illustrations of exemplary search system interfaces for an item feature accuracy engine, in which embodiments described herein may be employed;

FIG. 3 is a flow diagram showing an exemplary method for implementing a search system with an item feature accuracy engine, in accordance with embodiments described herein;

FIG. 4 is a flow diagram showing an exemplary method for implementing a search system with an item feature accuracy engine, in accordance with embodiments described herein;

FIG. 5 is a flow diagram showing an exemplary method for implementing a search system with an item feature accuracy engine, in accordance with embodiments described herein.

DETAILED DESCRIPTION

Figure 1A:
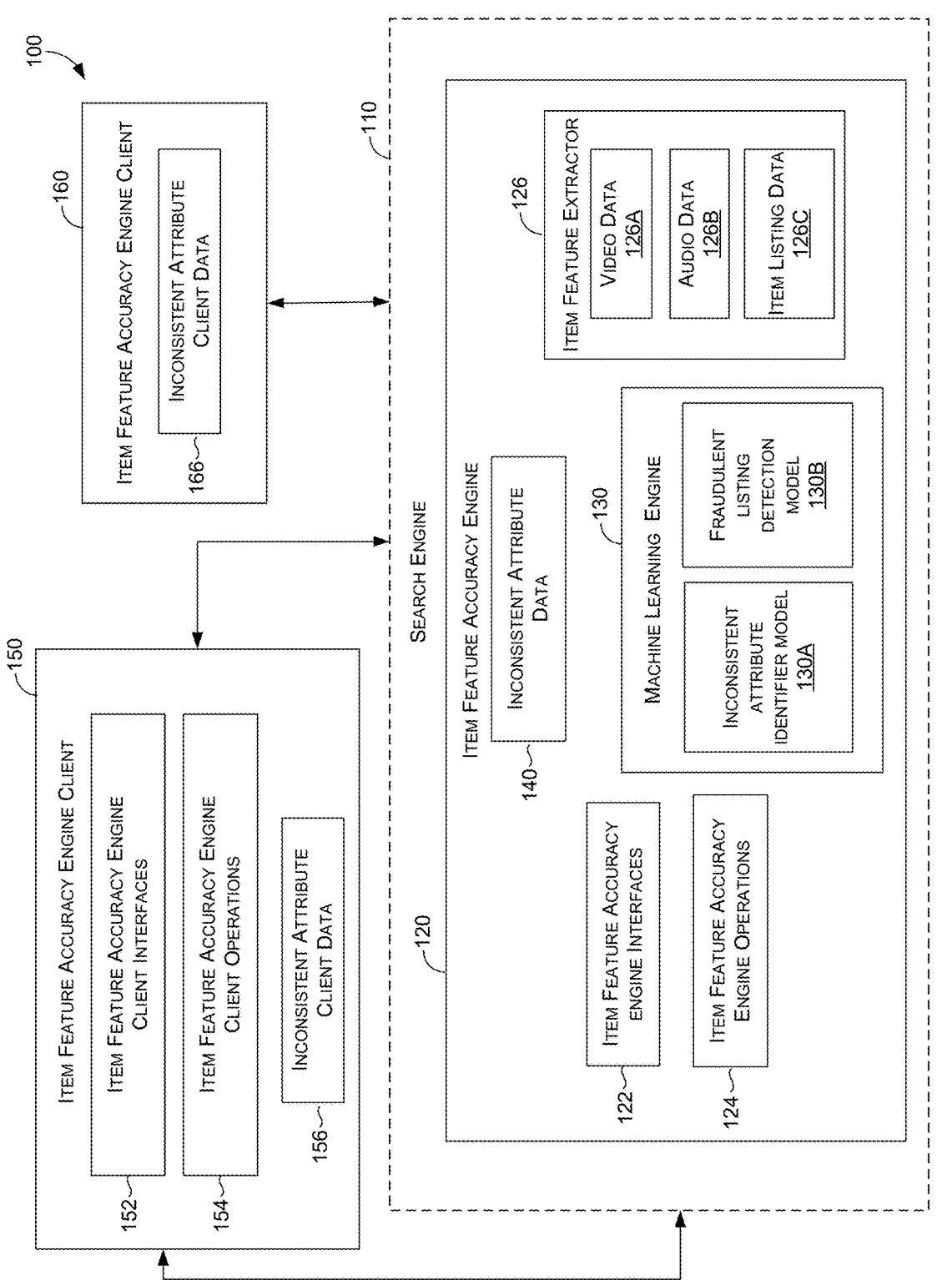
Figure 6:
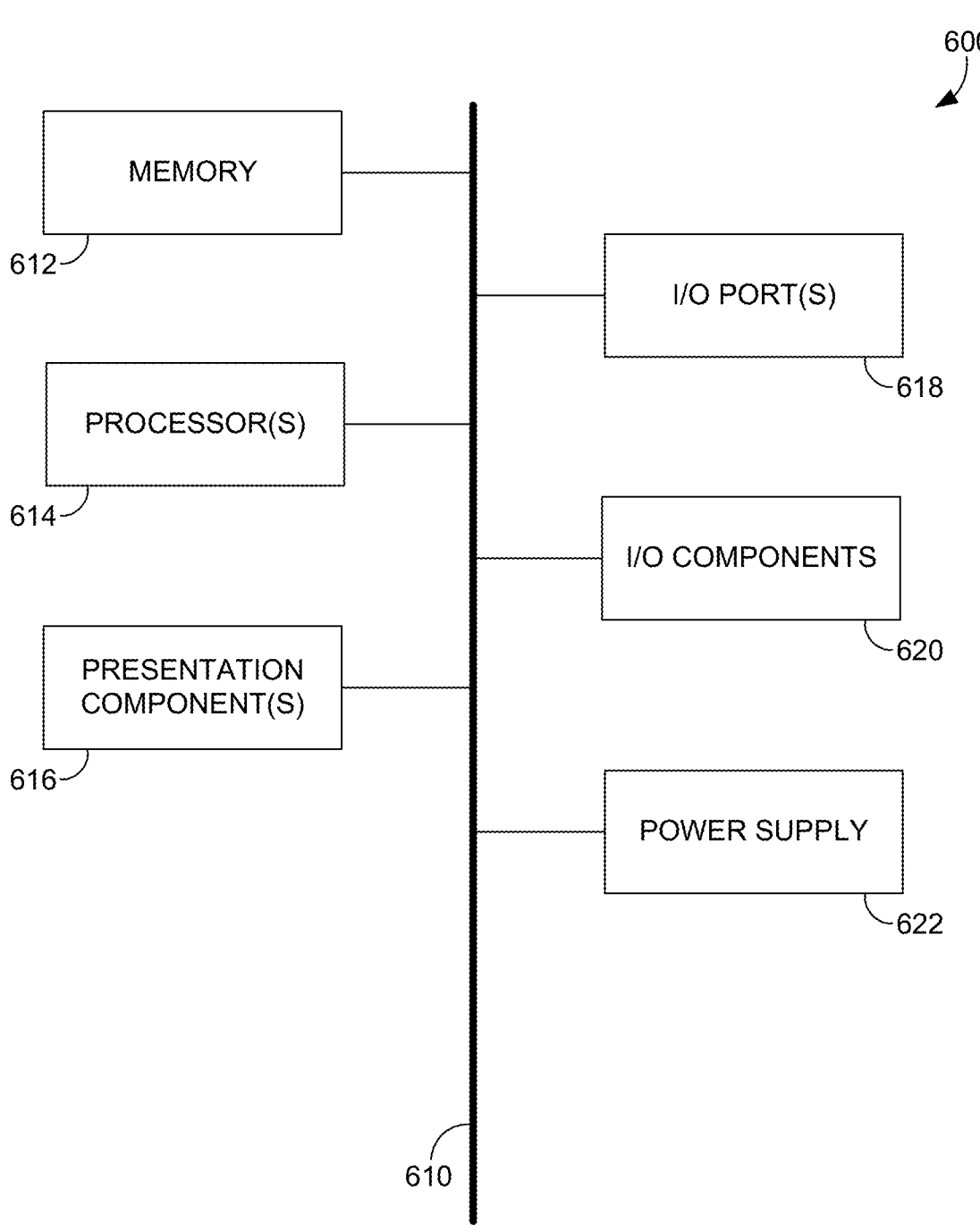
FIG. 6 is a block diagram of an exemplary computing environment suitable for use in implementing embodiments described herein.

Overview of Technical Problems, Technical Solutions, and Technological Improvements Search systems support identifying, for received queries, query result items from item databases. Item databases can specifically be for content systems or item listing systems such as EBAY content system, developed by EBAY INC., of San Jose, California. Conventional search systems can be implemented in search engines of item listing systems to support electronic activities associated with buying and selling items (e.g., products or online services). An item listing system or platform is accessible to list different types of items for sale—and to buy different items that different item features. Item features (e.g., listing-interface item features)—for items in the item listing system—can be defined in an item listing based on seller inputs identifying characteristics of the items being listed for sale. For example, an item listing system can include an item listing interface that allows a seller to enter item features of the item the seller would like to sell. For example, for a pair of shoes, the seller can identify the name, condition, shoe size, upload pictures—from different perspectives—of the shoes, and a short description. For some items, the item listing system may support uploading a video of the item. Sellers can upload the video of the item and further discuss—via audio of the video—item features similar to those identified above.

The item features entered via the item listing interface may be inaccurate for several reasons. For example, a seller may enter name "AIR JORDAN 1 MID BLACK HYPER ROYAL BLUE" but may mistakenly upload the pictures for the "AIR JORDAN 1 MID BLACK HYPER BLACK AND RED." So simple, errors can be an issue. However, in some situations, sellers may enter item features to intentionally mislead buyers into buying their items. For example, a seller may include item descriptions that are compliant with the rules of the item listing system, but circumvent the rules by uploading images or video that are not compliant with the rules of the item listing system. Specifically, the item listing system may forbid sellers from providing descriptions or titles that include a brand name when the specific item being sold is not of that brand name. However, some bad actors may provide descriptions that do not mention a brand name (e.g., POPULAR BRAND NAME), but provide media content (e.g., images, video, and other graphics) that include the POPULAR BRAND NAME that is not the brand name of the item being offered for sale. Overall, there are several fraudulent item listings that are made possible using media content and especially video—and conventional mechanisms for identifying these fraudulent item listings do not currently support identifying these types of fraudulent item listings. As such, an alternative and more comprehensive approach for determining item feature accuracy in an item listing system—particularly with reference to providing automated error checking and fraudulent listing detection functionality—can improve item feature accuracy operations and interfaces in an item listing system.

Embodiments of the present disclosure are directed to providing indications of inconsistent attributes in item listings that include item listing videos. An item listing interface supports receiving a video (e.g., item listing video) and item features. (e.g., listing-interface item features). An item listing system may support a listing tool that allows users to list items for sale on the item listing system. The item listing interface can support providing, a title, item features, conditions, photos, and video for an item listed for sale. The item listing video may be uploaded through the item listing interface. The video may or may not include audio. Uploading the loading the video can trigger analyzing the video to identify extracted item features. For example, the video may be analyzed to identify an item in the video to determine if the item features in video match the item features that have been entered by the seller in the item listing interface.

Extracted item features are identified from the video and item features are identified from selections or entries by the user on the item listing interface. The extracted item features may rely on the items features from listing-interface features (e.g., input fields) to determine which item to analyze in the video. For example, if the video includes multiple items, a specific item that is identified as the item for sale—on the item listing interface—is analyzed to extract item features. The extracted item features from the video can include video-based extracted features and audio-based extracted features. The extracted item features can be compared to the item features to determine any unexpected or unacceptable differences between the extracted item features and item features provided by the seller. These types of accuracy checks can be valuable for the seller who may have unintentionally made mistakes while listing an item for sale.

Extracted item features of the item—from video—are compared to the item features to identify and provide an indication of any errors (i.e., inconsistent attributes) identified when comparing the extracted item features and the item features from the item listing. For example, a seller may upload a video that includes "AIR JORDAN 1 MID BLACK HYPER ROYAL BLUE" and provide "BLACK AND RED" as item description or title feature. The extracted item feature color (i.e., item feature category) from the video will be identified as inconsistent with the item feature color. In this case, the seller may have erroneously uploaded a video with "AIR JORDAN 1 MID BLACK HYPER ROYAL BLUE" when the seller intended to upload a video with "AIR JORDAN 1 MID BLACK HYPER BLACK AND RED."

In addition, a seller may upload a video and different types (i.e., video or audio) of extracted item features are identified for an item in the video. The extracted item features can be in two different—feature types—based on whether the extracted item features are extracted based on video features or audio features of the video. For example, video features may identify an extracted item feature color—for "AIR JORDAN 1 MID BLACK HYPER BLACK AND RED" gyms shoes—as "ROYAL BLUE" and audio features (e.g., from the seller discussing the gym shoes) may also identify an extracted item feature color as "ROYAL BLUE." As such, item feature color can be identified as being inconsistent with both the video-based extracted item feature color and the audio-based extracted item feature color. As such, the video-based extracted item features, audio-based extracted item features, and listing-interface item features can be compared between each other to determine inconsistent attributes identified between all three types of item features.

Also, indications of inconsistent attributes in item listings that are included in item listing videos can be generated as part of fraud detection. In particular, inconsistent attributes identified from comparing item features and extracted item features can be used to make a prediction whether the item listing is a potential fraudulent item listing. A prediction that an item listing is a potential fraudulent item listing can be made when the inconsistent attributes of the item listing are similar to the inconsistent attributes of a fraudulent item listing motif. Fraudulent item listing motifs identify known inconsistent attributes in fraudulent items listings (e.g., an image having a brand logo, however, the description is missing the brand logo) in that fraudulent item listings often have recurring inconsistent attributes. For example, a fraudulent software listing motif may include a low price, special characters in the title, item descriptions, and a particular delivery method (e.g., instant delivery) that are inconsistent with the images provided. Fraudulent item listing motifs can include inconsistent attributes associated with comparisons of item features, video-based extracted item features and audio-based extracted features—such that, inconsistent attributes identified in an item listing can be compared to a set of inconsistent attributes of a fraudulent item listing motif to make a prediction whether the item listing is a potential fraudulent item listing.

A fraudulent item listing motifs—having a set of inconsistent attributes—can be accessed and compared to inconsistent attributes found in an item listing. For example, listing-interface item features of a software listing can be compared to extracted item features to identify a plurality of inconsistent attributes. The plurality of inconsistent attributes can be compared to inconsistent attributes associated with different fraudulent item listing motifs. If the plurality of inconsistent item attributes meet a similarity threshold with the inconsistent attributes of a fraudulent item listing motif, then this a prediction that the item listing is potentially a fraudulent item listing can be made. As such, an indication of a potential fraudulent item listing is generated and communicated to the listing interface or other internal resources in the search system for remedial actions.

Interface elements can be generated to communicate an indication of an inconsistent attribute or an indication of a potential fraudulent item listing. Interface elements can including graphical user interface elements that are associated with different types of user interaction models for interacting with the inconsistent attribute or the potential fraudulent item listing. Interface elements can be communicated to a seller interface, buyer interface, or administrator interface—as appropriate—to perform recovery operations with reference to the inconsistent attribute or the potential fraudulent item listing. For example, at a listing interface, a seller may be given an opportunity to resolve the inconsistent attribute, while an administrator interface a warning may be provide to the administrator of a potential fraudulent item listing to trigger remedial actions. Other variations and combinations of interface elements for inconsistent attributes and potential fraudulent item listings and recovery operations are contemplated with embodiments described herein.

Accordingly, embodiments of the present invention of the present invention are directed to simple and efficient methods, systems and computer storage media for providing indications of inconsistent attributes in item listings that are included in item listing videos. In operation, an item listing video—of an item listing—is accessed. The item listing video is accessed via an item listing interface of an item listing system. Extracted item features of an item from the item listing video, are accessed via a machine learning engine. The extracted item features are extracted based on listing-interface item features associated with listing the item. The extracted item features of the item are compared to the listing-interface item features of the item. Based on comparing the listing-interface item features to the extracted, an inconsistent attribute—between an extracted item feature and a listing-interface item feature that is associated with listing the item—is identified. An indication of an inconsistent attribute is communicated to cause display of the indication of the inconsistent attribute at the item listing interface. In addition, an indication of a potential fraudulent item listing corresponding to the item listing can be provided. The potential fraudulent item listing is identified when a plurality of inconsistent attributes of the item listing are similar to a set of inconsistent attributes of a fraudulent item listing motif.

Embodiments of the present invention have been described with reference to several inventive features (e.g., operations, systems, engines, and components) associated with a search system having an item feature accuracy engine. Inventive features described include: operations for comparing extracted features of an item to a listing interface features and based on comparing the extracted item features to the listing-interface item features, identifying an inconsistent attribute between an extracted item feature and a listing-interface item feature that is associated with listing the item. Functionality of the embodiments of the present invention have further been described, by way of an implementation and anecdotal examples, to demonstrate that the operations for providing inconsistent attributes—using an item feature accuracy engine—are an unconventional ordered combination of operations for a solution to a specific problem in search technology environment to improve computing operations and user interface navigation in search systems. Overall, these improvements result in less CPU computation, smaller memory requirements, and increased flexibility in search systems.

Overview of Exemplary Environments for Item Condition Prediction Engine Operations Aspects of the technical solution can be described by way of examples and with reference to FIGS. 1A, 1B, 1C, 2A and 2B. FIG. 1A is a block diagram of an exemplary technical solution environment, based on example environments described with reference to FIG. 1A for use in implementing embodiments of the technical solution are shown. Generally the technical solution environment includes a technical solution system suitable for providing the example search system 100 in which methods of the present disclosure may be employed. In particular, FIG. 1A shows a high level architecture of the search system 100 in accordance with implementations of the present disclosure. Among other engines, managers, generators, selectors, or components not shown (collectively referred to herein as "components"), the technical solution environment of search system 100.

With reference to FIG. 1A, FIG. 1A illustrates the exemplary search system 100 in which implementations of the present disclosure may be employed. In particular, FIG. 1A shows a high level architecture of search system 100 having components in accordance with implementations of the present disclosure. Among other components, managers, or engines not shown, search system 100 includes search engine 110, item feature accuracy engine 120, item feature accuracy engine interfaces 122, item feature accuracy engine operations 124, item feature extractor 126—including video data 126A, audio data 126B, and item listing data 126C—machine learning engine 130—including inconsistent attribute identifier model 130A and fraudulent listing detection model 130B, inconsistent attribute data 140, item feature accuracy client 150—including item feature accuracy engine client interfaces 132, item feature accuracy engine operations 134, inconsistent attribute data 136—and item feature accuracy engine client 160—including inconsistent attribute client data 166.

The item feature accuracy engine 120 is responsible for providing interfaces and operations (i.e., item feature accuracy engine interfaces 122 and item feature accuracy engine operations) associated with providing indications of inconsistent attributes for item listings that are include in item listing video. The item feature accuracy engine interfaces 122 can include communication interfaces and graphical user interfaces that support exchanging data and providing graphical user interface elements in the search system 100. The item feature accuracy engine operations 124 are provided to execute computing instructions for generating data (e.g., inconsistent attribute data). The item feature accuracy engine 120 operates with clients (e.g., item feature accuracy engine client 150 and item feature accuracy engine client 160) to provide the functionality described herein. The item feature accuracy engine clients includes interfaces and operations for processing inconsistent attribute data 140 to inconsistent attribute client data (e.g., inconsistent attribute client data 156 and inconsistent attribute client data 166).

The item feature accuracy engine client 150 can generate a listing interface (e.g., listing tool) to receive generate an item listing. The item listing can include input fields for item features of an item that is listed to for sale. The input fields—or listing-interface item features—can include an input field for item features that describe the item and provide additional information about characteristics of the item. The listing-interface item features can specifically include support for receiving an item listing video. The item listing video can be video that corresponds to an item being listed for sale. The item listing video may include other items; however, the item listing video would likely predominantly include content (e.g., video feature and audio features) associated the item of the item listing.

With reference to FIG. 2A, FIG. 2A includes an illustration of an example listing interface. Listing interface 210 includes a listing-interface item features portion 212 for receiving listing-interface item features that describe the item. Listing interface 210 further includes upload video portion 214 for uploading an item listing video associated with the item. Listing interface 220 includes item listing video 222 uploaded to the item listing. Upon receiving the item listing video and listing-interface item features associated with the item listing, the item listing including the item listing video are communicated to the item feature accuracy engine 120. Listing interface 230 includes item listing processing graphical element 232 as an indication to the user that the uploaded video is being processed for errors.

The item feature accuracy engine 120 includes an item feature extractor 126 that supports extracting item features. Feature extraction can be executed based on image recognition, audio recognition, and pattern recognition and processing. The item feature extractor 126 includes pre-trained machine learning models that extract video-based item features (e.g., video data 126A) and audio-based item feature (e.g., audio data). The item feature extractor 126 uses the machine learning models to identify features associated with the item in the item listing. The item feature extractor 126 can rely on item listing data (e.g., listing-interface item features) to provide context for what video-based item features and audio-based item features to extract from the item listing video. The item feature extractor 126 can specifically target—for an item—the listing-interface item features of an item feature category (e.g., color, brand, condition, etc.) that are identified in the video and audio. In this way, the video-based item features, audio-based item features, and listing-interface item features of an item feature category can be compared to each other to determine if inconsistent attributes exist.

The machine learning engine 130 is trained on historical item listing data, where training is based on Convolutional Neural Network and Bidirectional Long Short-Term Memory encoding. In particular, item listing data may be analyzed at a character level using convolution network techniques. Convolution neural networks support deep learning without artificially embedding knowledge about words, phrases, sentences, or any other syntactic or semantic structures associated with language. Bi-directional long short-term memory (Bi-LSTM) is an artificial neural network where connections between units form a directed graph along a sequence. In particular, Bi-LSTM may be used for processing sequential data. The item feature accuracy engine implements both a convolutional neural network and Bi-LSTM for encoding and classifying inconsistent attributes and fraudulent listing. For example, the convolution neural network may be used to encode fraudulent item listing motifs with inconsistent attributes such that a prediction can be made that an item listing is a potential fraudulent item listing based on a threshold similarity between the inconsistent attributes in the item listing and inconsistent attributes in a fraudulent item listing motif.

The machine learning engine 130 is responsible for comparing the item features (i.e., extracted item features and listing-interface item features). The machine learning engine 130 includes pre-trained machine learning models (e.g., an inconsistent attribute identifier model 132) that support comparing item features. In one implementation, the extracted features and listing-interface item features can be compared based on their corresponding item feature category. An item feature category can be identified and the values of the item feature category for the listing-interface item feature, video-based item feature, audio-based item feature are compared to each other. It is contemplated that there can be any number of combinations of outcomes—such as—the values are all the same, the values of two are the same and one is different, the values of all three are different. Whenever the values within a particular item feature category are different, the item feature category is identified as an inconsistent attribute in the item listing. The result of the comparison can be stored in inconsistent attribute data (e.g., inconsistent attribute data 140) and communicated to an item feature accuracy engine client.

The machine learning engine 130 further supports comparing a plurality of inconsistent attributes of an item listing to a set of inconsistent attributes of a fraudulent item listing motif. The machine learning engine 130 includes a fraudulent listing detection model that includes a pre-trained machine learning model associated with plurality of fraudulent item listing motifs. The fraudulent item listing motifs are generated based on training the machine learning models on historical fraudulent listings and the inconsistent attributes identified in different historical fraudulent listings. Each fraudulent item listing motif is associated with a corresponding set of inconsistent attributes. The plurality of inconsistent attributes of an item listing can be compared to inconsistent attributes of a fraudulent item listing motif. A determination (e.g., a machine learning engine prediction) can be made that an item listing is a potential fraudulent item listing based on a threshold similarity (e.g., a similarity score) between the inconsistent attributes of the item and the set of inconsistent attributes of a fraudulent item listing motif. As such, an indication of a potential fraudulent item listing is generated for the listing. The potential fraudulent item listing can also be stored inconsistent attribute data (e.g., inconsistent attribute data 140) and communicated to the item feature accuracy engine client 150.

The item feature accuracy client 150 is responsible for processing the inconsistent attribute data 140 into inconsistent attribute client data 156 and causing generation of graphical user interfaces for communicating the inconsistent attribute data 156. The inconsistent attribute data 156 can include an indication of inconsistent attributes identified in an item listing based on comparing the extracted features to the listing-interface items features. The indication of inconsistent attributes can be provided with interface elements that support resolving the inconsistent attribute or interface elements that provide informational data associated with the inconsistent attribute. The interface elements can identify the inconsistent attribute, the item feature category of the inconsistent attribute, the inconsistency between the listing-interface item feature and an extracted item feature. In one implementation, upon resolving the inconsistency, the comparison operations can be executed again to confirm no additional inconsistent attributes exist.

The item feature accuracy client 150 is responsible for processing the inconsistent attribute data 140 into inconsistent attribute client data 166 and causing generation of graphical user interfaces for communicating the inconsistent attribute data 166. The item feature accuracy engine client 160 can specifically be an administrator client and the inconsistent attribute data 166 can include an indication of a potential fraudulent item listing based on comparing a plurality of inconsistent attributes of an item listing to a set of inconsistent attributes in a fraudulent item listing motif. The indication of the potential fraudulent item listing can be updated with additional information before forwarding the potent fraudulent item listing—via the administrator client—to a seller. In another instance, the indication of the potent fraudulent listing may communicated directly to the listing interface of the seller. The indication of the potential fraudulent item listing can also include additional information associated with the fraudulent item listing motif that was matched to the item listing and the inconsistent attributes associated with the item listing.

With reference to FIG. 2B, FIG. 2B includes an illustration of an example listing interface. Inconsistent attribute interface 240 includes an error(s) found portion 242 that supports providing an indication of an inconsistent attribute—along with an error resolution portion (e.g., interface element 244) that supports performing operations for resolving the inconsistent attribute. Inconsistent attribute interface 260 includes a no error(s) found portion 252 that supports providing an indication that no inconsistent attributes were found—along with a no error resolution needed portion (e.g., interface element 254) that supports performing operations to proceed with listing the item. Inconsistent attribute interface 260—for example via an administrator client—

10 includes a potential fraudulent item listing portion 262 that supports providing an indication of a potential fraudulent item listing—along with an administrator remedial action portion (e.g., interface element 254) that supports triggering remedial operations from the administrator client. Other variations and combinations of inconsistent attribute interfaces are contemplated with in accordance with embodiments disclosed herein.

Turning to FIGS. 1B and 1C, FIGS. 1B and 1C illustrate, the item feature accuracy engine client 150, the item feature accuracy engine client 160 and the item feature accuracy engine 120. The item feature accuracy engine client 150, the item feature accuracy engine client 160, and the item feature accuracy engine 120 are configured to perform the operations identified. The item feature accuracy engine 150, at block 10, generates an item listing interface that supports receiving listing-interface features and an item listing video; and at block 12, communicate the listing-interface features and the time listing video to cause an item feature accuracy engine to identify an inconsistent attribute.

The item feature accuracy engine 120, at block 20, accesses an item listing video of an item listing for an item; at block 30, extracts item features including video-based extracted item features and audio-based extracted item features; and at block 32, accesses extracted item features of the item of the item listing video. The item feature accuracy engine 120, at block 40, compares the extracted item feature of the item to the listing-interface item features of the item. Comparing the extracted item features can include, at block 50, causing an inconsistent attribute identifier model to identify an inconsistent attribute by comparing the listing-interface item features, video-based extracted item features, and audio-based extracted item features between each other—and at block 54, identifying an inconsistent attribute between an extracted item feature and a listing-interface item feature from the item listing of the item.

At block 54, the item feature accuracy engine 120 further causes a fraudulent listing detection model to compare and match the inconsistent attribute to fraudulent item listing motifs, and at block 56, determines that the item listing is a potential fraudulent item listing based on comparing the inconsistent attribute the fraudulent item listing motifs. The item feature accuracy engine 120, at block 60A, communicates an indication of the inconsistent attribute to cause display of the indication at an item listing interface, and at block 60B communicates an indication of the potential fraudulent item listing that corresponds to the item listing. The item feature accuracy engine client 150, at block 70, causes display of the indication of the inconsistent attribute at the item listing interface; and at block 80A, causes display of an indication of a potent fraudulent item listing that corresponds to the item listing. The item feature accuracy engine client 160, at block 80B, causes display of the indication of the potential fraudulent item listing that corresponds to the item listing.

Exemplary Methods for Providing Item Condition Prediction Engine Operations

With reference to FIGS. 3, 4 and 5, flow diagrams illustrate methods for providing indications of inconsistent attributes of item listings associated in item listing videos. The methods may be performed using the search system, item feature accuracy engine, and item feature accuracy client, described herein. In embodiments, one or more computer-storage media having computer-executable or computer-useable instructions embodied thereon that, when executed, by one or more processors can cause the one or more processors to perform the methods (e.g., computer-implemented method) in the search system (e.g., a computerized system or computing system).

Turning to FIG. 3, a flow diagram is provided that illustrates a method 300 for implementing a search system for providing indications of inconsistent attributes of item listings associated with item listing videos. The method includes, initially at block 302, accessing an item listing video of an item. The item listing video is received via an item listing interface of an item listing system. At block 304, accessing extracted item features of the item from the item listing video. The extracted item features are extracted based on listing-interface items features associated with the item listing.

At block 306, the method includes comparing the extracted item features of the item to the listing-interface item features; and at block 308, based on comparing the extracted item features to the listing-interface item features, identifying an inconsistent attribute between an extracted item feature and a listing-interface item feature of the item. The item listing system comprises an item feature accuracy machine learning engine that supports comparing extracted item features to listing-interface item features to identify inconsistent attributes between the extracted item features and the listing-interface item features. The item feature accuracy machine learning engine includes an inconsistent attribute identifier model for identifying the inconsistent attributes. At block 310, the method includes causing display of an indication of the inconsistent attribute at the listing interface.

Turning to FIG. 4, a flow diagram is provided that illustrates a method 400 for implementing a search system for providing indications of inconsistent attributes of item listings associated with item listing videos. The method includes, at block 402, accessing an item listing video of an item. The item listing video is received via an item listing interface of an item listing system. And, at block 404, the method includes accessing extracted item features of the item listing video. The extracted features are based on listing-interface item features. The extracted features comprise video-based extracted item features and audio-based extracted features.

At block 406, the method includes comparing the listing-interface item features, the video-based extracted item features, and audio-based extracted item features. And, at block 408, based on comparing the listing-interface item features, the video-based extracted features, identifying an inconsistent attribute between the listing-interface item features, the video-based extracted item features, and audio-based extracted item features. At block 410, the method includes causing display of an indication of the inconsistent attribute at the item listing interface.

Turning to FIG. 5, a flow diagram is provided that illustrates a method 500 for implementing a search system for providing indications of inconsistent attributes of item listings associated with item listing videos. The method includes, at block 502, accessing a plurality of inconsistent attributes between listing-interface item features and extracted item features; and at block 504, causing a fraudulent listing detection model to match the plurality of inconsistent attributes to sets of inconsistent attributes in fraudulent item listing motifs.

The item listing system comprises a machine learning engine that supports comparing extracted item features to listing-interface item features to identify inconsistent attributes between the extracted item features and the listing-interface item features. The machine learning engine comprises an inconsistent attribute identifier model for identifying the inconsistent attributes and a fraudulent listing detection model associated with a plurality of fraudulent item listing motifs for identifying fraudulent item listings. At block 506, the method includes determining that the item listing is a potential fraudulent item listing based on matching the plurality of inconsistent attributes to a set of inconsistent attributes in a fraudulent item listing motif. At block 508, the method includes communicating an indication of the potential fraudulent item listing that corresponds to the item listing.

Example Search System Environment

With reference to the search system 100, embodiments described herein support providing query result items based on an item condition prediction engine. The search system components refer to integrated components that implement the image search system. The integrated components refer to the hardware architecture and software framework that support functionality using the search system components. The hardware architecture refers to physical components and interrelationships thereof and the software framework refers to software providing functionality that may be implemented with hardware operated on a device. The end-to-end software-based search system may operate within the other components to operate computer hardware to provide search system functionality. As such, the search system components may manage resources and provide services for the search system functionality. Any other variations and combinations thereof are contemplated with embodiments of the present invention.

By way of example, the search system may include an API library that includes specifications for routines, data structures, object classes, and variables may support the interaction the hardware architecture of the device and the software framework of the search system. These APIs include configuration specifications for the search system such that the components therein may communicate with each other for form generation, as described herein.

With reference to FIG. 1A, FIG. 1A illustrates an exemplary search system 100 in which implementations of the present disclosure may be employed. In particular, FIG. 1A shows a high level architecture of search system 100 having components in accordance with implementations of the present disclosure. It should be understood that this and other arrangements described herein are set forth only as examples. In addition, a system, as used herein, refers to any device, process, or service or combination thereof. As used herein, engine is synonymous with system unless otherwise stated. A system may be implemented using components or generators as hardware, software, firmware, a special-purpose device, or any combination thereof. A system may be integrated into a single device or it may be distributed over multiple devices. The various components or generators of a system may be co-located or distributed. For example, although discussed for clarity as the content application component, operations discussed may be performed in a distributed manner. The system may be formed from other systems and components thereof. It should be understood that this and other arrangements described herein are set forth only as examples.

Having identified various component of the search system 100, it is noted that any number of components may be employed to achieve the desired functionality within the scope of the present disclosure. Although the various components of FIG. 1A are shown with lines for the sake of clarity, in reality, delineating various components is not so clear, and metaphorically, the lines may more accurately be grey or fuzzy. Further, although some components of FIG.

1A are depicted as single components, the depictions are exemplary in nature and in number and are not to be construed as limiting for all implementations of the present disclosure. The search system 100 functionality may be further described based on the functionality and features of the above-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Example Search System Environment

With reference to the search system 100, embodiments described herein support providing query result items based on an item feature accuracy engine. The search system components refer to integrated components that implement the image search system. The integrated components refer to the hardware architecture and software framework that support functionality using the search system components. The hardware architecture refers to physical components and interrelationships thereof and the software framework refers to software providing functionality that may be implemented with hardware operated on a device. The end-to-end software-based search system may operate within the other components to operate computer hardware to provide search system functionality. As such, the search system components may manage resources and provide services for the search system functionality. Any other variations and combinations thereof are contemplated with embodiments of the present invention.

By way of example, the search system may include an API library that includes specifications for routines, data structures, object classes, and variables may support the interaction the hardware architecture of the device and the software framework of the search system. These APIs include configuration specifications for the search system such that the components therein may communicate with each other for form generation, as described herein.

With reference to FIG. 1A, FIG. 1A illustrates an exemplary search system 100 in which implementations of the present disclosure may be employed. In particular, FIG. 1A shows a high level architecture of search system 100 having components in accordance with implementations of the present disclosure. It should be understood that this and other arrangements described herein are set forth only as examples. In addition, a system, as used herein, refers to any device, process, or service or combination thereof. As used herein, engine is synonymous with system unless otherwise stated. A system may be implemented using components or generators as hardware, software, firmware, a special-purpose device, or any combination thereof. A system may be integrated into a single device or it may be distributed over multiple devices. The various components or generators of a system may be co-located or distributed. For example, although discussed for clarity as the content application component, operations discussed may be performed in a distributed manner. The system may be formed from other systems and components thereof. It should be understood that this and other arrangements described herein are set forth only as examples.

Having identified various component of the search system 100, it is noted that any number of components may be employed to achieve the desired functionality within the scope of the present disclosure. Although the various components of FIG. 1A are shown with lines for the sake of clarity, in reality, delineating various components is not so clear, and metaphorically, the lines may more accurately be grey or fuzzy. Further, although some components of FIG. 1A are depicted as single components, the depictions are exemplary in nature and in number and are not to be construed as limiting for all implementations of the present disclosure. The search system 100 functionality may be further described based on the functionality and features of the above-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Example Computing Environment

Having briefly described an overview of embodiments of the present invention, an example operating environment in which embodiments of the present invention may be implemented is described below in order to provide a general context for various aspects of the present invention. Referring initially to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects herein-above set forth together with other advantages which are obvious and which are inherent to the structure.

It will be understood that certain features and sub-com-binations are of utility and may be employed without reference to other features or sub-combinations. This is contemplated by and is within the scope of the claims.

The invention claimed is:

1. A computer-implemented, the method comprising:

accessing, at a machine learning engine, a plurality of inconsistent attributes between listing-interface item features and extracted item features, the machine learn-ing engine comprising an inconsistent attribute identi-fier model for identifying inconsistent attributes and a fraudulent listing detection model associated with a plurality of fraudulent item listing motifs for identify-ing fraudulent item listings, wherein the machine learning engine is trained on his-torical item listing data associated with the inconsistent attribute identifier model and fraudulent item listing motifs associated with the fraudulent listing detection model, wherein the machine learning engine supports predicting whether item listings are fraudulent item listings based on inconsistent attributes in the item listings and incon-sistent attributes in fraudulent item listing motifs, wherein a fraudulent item listing motif is associated with a set of at least two inconsistent attributes that in combination indicate a potential fraudulent item listing;

using the machine learning engine, comparing the plural-ity of inconsistent attributes to sets of inconsistent attributes in fraudulent item listing motifs;

determining that the item listing is a potential fraudulent item listing based on matching the plurality of incon-sistent attributes to the set of at least two inconsistent attributes; and communicating an indication of the potential fraudulent item listing that corresponds to the item listing.

2. The method of claim 1, wherein the item listings are associated with an item listing system that comprises the machine learning engine that supports comparing extracted item features to listing-interface item features to identify the inconsistent attributes between the extracted item features and the listing-interface item features.

3. The method of claim 1, wherein the machine learning engine is associated with an item feature extractor that supports extracting video-based extracted item features and audio-based extracted item features from the item listing video and extracting listing-interface item features from the item listing of the item.

4. The method of claim 1, wherein comparing the extracted item features to the listing-interface item features comprises comparing the listing-interface item features, video-based extracted item features of the extracted item features, and audio-based extracted item features of the extracted item features between each other.

5. The method of claim 1, wherein the inconsistent attribute corresponds to an item feature category, wherein a first value of the item feature category from the listing-interface item feature is different from a second value of the item feature category from the extracted item feature.

6. The method of claim 1, wherein the potential fraudulent item listing is identified based on the plurality of inconsis-tent attributes of the item listing meeting a similarity thresh-old to the set of at least two inconsistent attributes.

7. The method of claim 1, further comprising causing generation of an inconsistent attribute interface elements at an item listing interface, wherein the inconsistent attribute interface elements support resolving the potential fraudulent item listing, or wherein the inconsistent attribute interface elements provide informational data associated with the potential fraudulent item listing.

8. One or more computer storage media having computer-executable instructions embodied thereon that, when executed, by one or more processors, cause the one or more processors to perform a method, the method comprising:

accessing, at a machine learning engine, a plurality of inconsistent attributes between listing-interface item features and extracted item features, the machine learn-ing engine comprising an inconsistent attribute identi-fier model for identifying inconsistent attributes and a fraudulent listing detection model associated with a plurality of fraudulent item listing motifs for identify-ing fraudulent item listings, wherein the machine learning engine is trained on his-torical item listing data associated with the inconsistent attribute identifier model and fraudulent item listing motifs associated with the fraudulent listing detection model, wherein the machine learning engine supports predicting whether item listings are fraudulent item listings based on inconsistent attributes in the item listings and incon-sistent attributes in fraudulent item listing motifs, wherein a fraudulent item listing motif is associated with a set of at least two inconsistent attributes that in combination indicate a potential fraudulent item listing;

using the machine learning engine, comparing the plural-ity of inconsistent attributes to sets of inconsistent attributes in fraudulent item listing motifs;

determining that the item listing is a potential fraudulent item listing based on matching the plurality of incon-sistent attributes to the set of at least two inconsistent attributes; and communicating an indication of the potential fraudulent item listing that corresponds to the item listing.

9. The media of claim 8, wherein the item listings are associated with an item listing system that comprises the machine learning engine that supports comparing extracted item features to listing-interface item features to identify the inconsistent attributes between the extracted item features and the listing-interface item features.

10. The media of claim 8, wherein the machine learning engine is associated with an item feature extractor that supports extracting video-based extracted item features and audio-based extracted item features from the item listing video and extracting listing-interface item features from the item listing of the item.

11. The media of claim 8, wherein comparing the extracted item features to the listing-interface item features comprises comparing the listing-interface item features, video-based extracted item features of the extracted item features, audio-based extracted item features of the extracted item features between each other.

12. The media of claim 8, wherein the inconsistent attribute corresponds to an item feature category, wherein a first value of the item feature category from the listing-interface item feature is different from a second value of the item feature category from the extracted item feature.

13. The media of claim 8, wherein the potential fraudulent item listing is identified based on the plurality of inconsistent attributes of the item listing meeting a similarity threshold to the set of at least two inconsistent attributes.

14. The media of claim 8, further comprising causing generation of an inconsistent attribute interface elements at an item listing interface, wherein the inconsistent attribute interface elements support resolving the potential fraudulent item listing, or wherein the inconsistent attribute interface elements provide informational data associated with the potential fraudulent item listing.

15. A system, the system comprising:

one or more processors; and one or more computer storage media storing computer-useable instructions that, when used by the one or more processors, cause the one or more processors to execute:

accessing, at a machine learning engine, a plurality of inconsistent attributes between listing-interface item features and extracted item features, the machine learning engine comprising an inconsistent attribute identifier model for identifying inconsistent attributes and a fraudulent listing detection model associated with a plurality of fraudulent item listing motifs for identifying fraudulent item listings, wherein the machine learning engine is trained on historical item listing data associated with the inconsistent attribute identifier model and fraudulent item listing motifs associated with the fraudulent listing detection model, wherein the machine learning engine supports predicting whether item listings are fraudulent item listings based on inconsistent attributes in the item listings and inconsistent attributes in fraudulent item listing motifs, wherein a fraudulent item listing motif is associated with a set of at least two inconsistent attributes that in combination indicate a potential fraudulent item listing;

using the machine learning engine, comparing the plurality of inconsistent attributes to sets of inconsistent attributes in fraudulent item listing motifs;

determining that the item listing is a potential fraudulent item listing based on matching the plurality of inconsistent attributes to the set of at least two inconsistent attributes; and communicating an indication of the potential fraudulent item listing that corresponds to the item listing.

16. The system of claim 15, wherein the item listings are associated with an item listing system that comprises the machine learning engine that supports comparing extracted item features to listing-interface item features to identify the inconsistent attributes between the extracted item features and the listing-interface item features.

17. The system of claim 15, wherein the machine learning engine is associated with an item feature extractor that supports extracting video-based extracted item features and audio-based extracted item features from the item listing video and extracting listing-interface item features from the item listing of the item.

18. The system of claim 15, wherein comparing the extracted item features to the listing-interface item features comprises comparing the listing-interface item features, video-based extracted item features of the extracted item features, and audio-based extracted item features of the extracted item features between each other.

19. The system of claim 15, wherein the potential fraudulent item listing is identified based on the plurality of inconsistent attributes of the item listing meeting a similarity threshold to the set of at least two inconsistent attributes.

20. The system of claim 15, further comprising causing generation of an inconsistent attribute interface elements at the item listing interface, wherein the inconsistent attribute interface elements support resolving the potential fraudulent item listing, or wherein the inconsistent attribute interface elements provide informational data associated with the potential fraudulent item listing.

\* \* \* \* \*